United States Patent [19]
Asmussen et al.

[11] 3,959,598
[45] May 25, 1976

[54] IDENTIFICATION FORWARDING CIRCUIT FOR USE WITH TONE-TO-PULSE CONVERTERS

[75] Inventors: Daniel R. Asmussen, Kirkland; Ray Ma, Seattle, both of Wash.

[73] Assignee: Tel-Tone Corporation, Kirkland, Wash.

[22] Filed: Apr. 15, 1974

[21] Appl. No.: 460,711

[52] U.S. Cl. .......................... 179/16 EC; 179/17 A; 179/18 FH
[51] Int. Cl.² ..................................... H04M 15/36
[58] Field of Search ......... 179/17 A, 16 EC, 18 FH, 179/18 E, 90 K

[56] References Cited
UNITED STATES PATENTS

| | | | |
|---|---|---|---|
| 2,277,623 | 3/1942 | Allen | 179/17 A |
| 2,400,908 | 5/1946 | Birss | 179/16 EA |
| 2,535,765 | 12/1950 | Voss | 179/17 A |
| 3,187,105 | 6/1965 | Parry | 179/16 E |
| 3,339,028 | 8/1967 | Taugner | 179/17 A |
| 3,721,768 | 3/1973 | Mazac et al. | 179/16 EC |
| 3,863,036 | 1/1975 | McCrudden | 179/17 A |

*Primary Examiner*—William C. Cooper
*Assistant Examiner*—Randall P. Myers
*Attorney, Agent, or Firm*—Christensen, O'Connor, Garrison & Havelka

[57] ABSTRACT

A circuit for making existing automatic number identification (ANI) equipment in a telephone central office compatible with multifrequency tone telephone using tone-to-pulse converters. In a typical ANI system, the telephone of one party on a two-party line includes an identification circuit, such as a connection to ground, while the other telephone does not include such a connection. When one party initiates a call, the tone-to-pulse converter interrupts the direct line pair connection between the telephone and the central office, in order to convert the multifrequency tones generated by the telephone into corresponding pulses recognizable by the central office. During this period, a voltage comparator in the preferred embodiment of the identification forwarding circuit serves to detect the voltage condition of the line pair portion connected to the one telephone, which condition varies depending on the presence or absence of the connection to ground in the telephone. A controlled gate, responsive to the voltage comparator, in turn connects a similar identification circuit as in the telephone to the line pair portion connected to the central office in the event that the voltage comparator recognizes a first voltage condition, and isolates the similar identification circuit from the line pair portion connected to the central office when the voltage comparator recognizes a second voltage condition.

16 Claims, 3 Drawing Figures

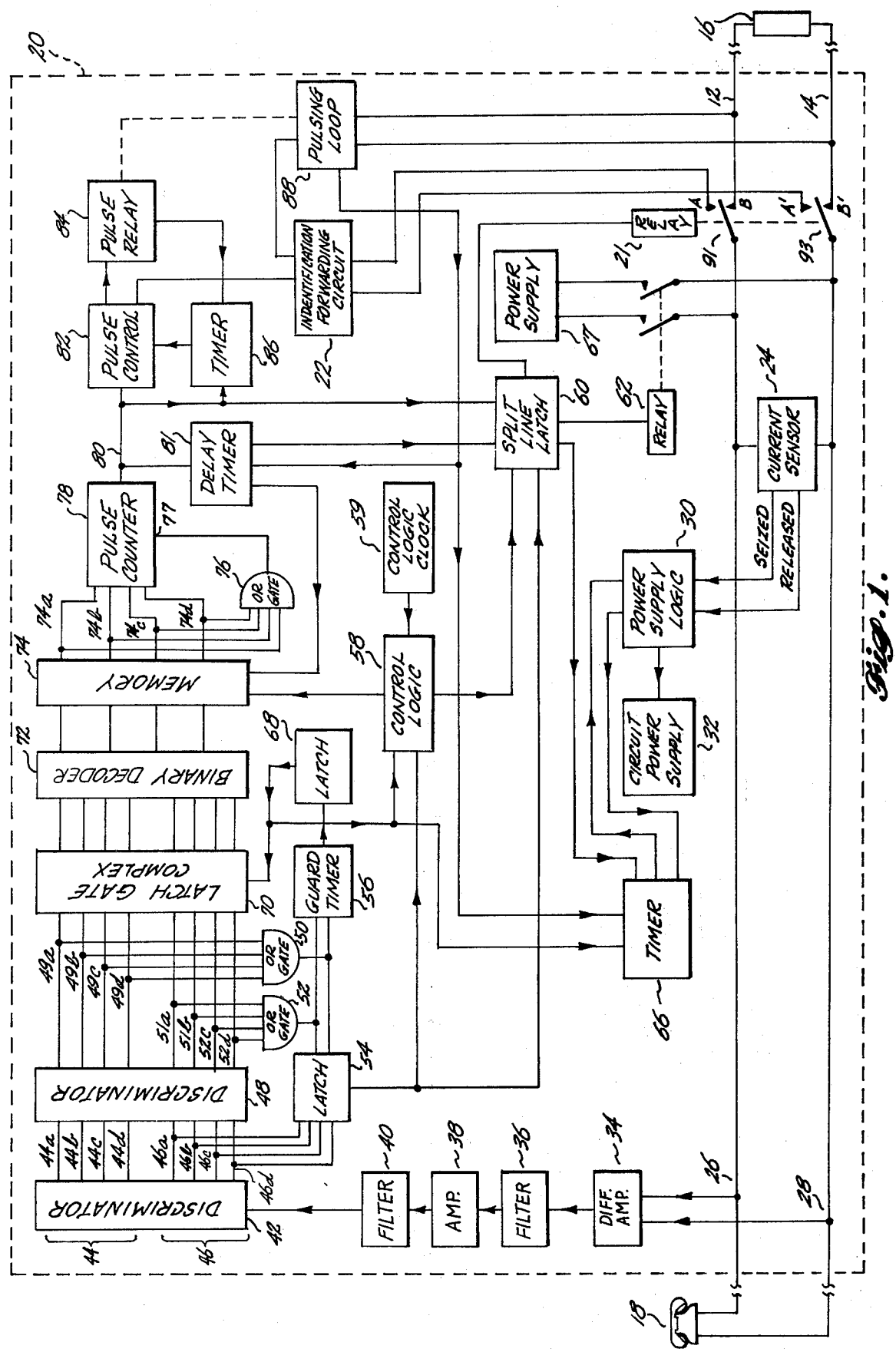

IDENTIFICATION FORWARDING CIRCUIT FOR USE WITH TONE-TO-PULSE CONVERTERS

BACKGROUND OF THE INVENTION

This invention relates generally to the telephone art and more specifically to the art of automatic number identification of telephones.

It is well-known in the art to use telephones generating dual tone multi-frequency signals (dtmf) in combination with pulse-responsive switching equipment at a telephone central office. The apparatus which converts the multi-frequency tones generated by such telephones into corresponding pulses compatible with existing central office switching equipment is known as a tone-to-pulse converter. Several types of tone-to-pulse converters are currently used, among them the converters disclosed in U.S. Pat. No. 3,133,155 to Kuchas and U.S. Pat. No. 3,291,913 to Hanna et al. By using such tone-to-pulse converters, however, which operate to momentarily break the circuit connection between the tip and ring lines from the central office, and the tip and ring lines in the telephone, the prior art system used with dial telephones for automatic number identification (ANI) of telephones using two-party lines is rendered inoperative.

The ANI system operates to automatically identify which party on a two-party line is making a long distance (toll) call, and hence, which party should be charged for the call. Such a system is, of course, unnecessary for single party lines. The use of such a system eliminates the need for an operator to come on the line whenever a long distance call is made by one party on a two-party line.

In such a system used with dial telephones, one party on a two-party line will have a ground loop (e.g. an inductor or resistor connected to ground) connected to either the tip or ring line in his telephone. The ground loop causes an imbalance between the voltage present at the tip and ring lines, respectively, when a voltage is placed across them. When one party on the two-party line makes a long distance call, he can be distinguished by ANI equipment at the central office from the other party on the two-party line through detection of the voltage imbalance (or lack thereof) between the tip and ring lines, due to the presence (or absence) of the ground loop connected to one line of the telephone of the calling party. For instance, if the tip party telephone includes the ground loop, and a voltage imbalance is detected by the central office ANI equipment, the tip party is making a call, while a voltage balance indicates that the ring party is making the call. The detection of the voltage imbalance can only occur during the time in which the central office is directly connected to the calling party, i.e. during dialing and switching, and typically occurs between the dialing of the first and second digits by the calling party.

Tone-to-pulse converters, however, break the circuit between the telephone and the central office during "dialing" to convert tones generated by a multi-frequency signal telephone into corresponding pulses recognizable by central office switching equipment, and the loss of circuit continuity during this time prevents the establishment of a voltage imbalance on the portion of the tip and ring lines connected to the central office, and hence prevents identification of the calling party. Unless remedied, an operator would be required to come on the line each time one of the parties on a two-party line attempted to complete a long distance telephone call.

In view of the above, it is a general object of the present invention to overcome the disadvantages of the prior art.

It is another object of the present invention to provide automatic number identification of each party on a two-party line.

It is another object of the present invention to provide an identification forwarding circuit which makes existing ANI equipment compatible with telephones using tone-to-pulse converters.

It is another object of the present invention to provide such a circuit which may be located within a telephone.

It is a still further object of the present invention to provide such a circuit which is inexpensive to manufacture and easy to install.

It is yet another object of the present invention to provide such a circuit which detects the presence or absence of a ground connection on the tip and ring line pair portion connected between a telephone and a tone-to-pulse converter during tone-to-pulse conversion.

It is a still further object of the present invention to provide such a circuit which duplicates the presence or absence of a ground connection on the tip and ring line pair portion connected between a telephone and a tone-to-pulse converter during tone-to-pulse conversion with respect to the tip and ring line pair portion connected between the tone-to-pulse converter and a central office during tone-to-pulse conversion.

SUMMARY OF THE INVENTION

Accordingly, the present invention is an identification forwarding circuit which is useful in a communications system which includes a central station connected by a hard wire line pair to at least one remote station. The circuit includes means separating the line pair connection between the remote station and the central station during initiation of a communication by the remote station into a first line pair portion connected to the remote station, and a second line pair portion connected to the central station, and which further includes first circuit means which establishes a predetermined identification condition on the first line pair portion. A detector in the identification forwarding circuit detects the predetermined identification condition on the first line pair portion during the initiation of the communication, and if the identification condition is detected, second circuit means is energized to establish on the second line pair portion the identical predetermined identification condition present on the first line pair portion.

DESCRIPTION OF THE DRAWINGS

FIG. 1 is a block diagram of a tone-to-pulse conversion circuit useful in combination with the identification forwarding circuit of the present invention.

DESCRIPTION OF THE PREFERRED EMBODIMENT

Figure 3:
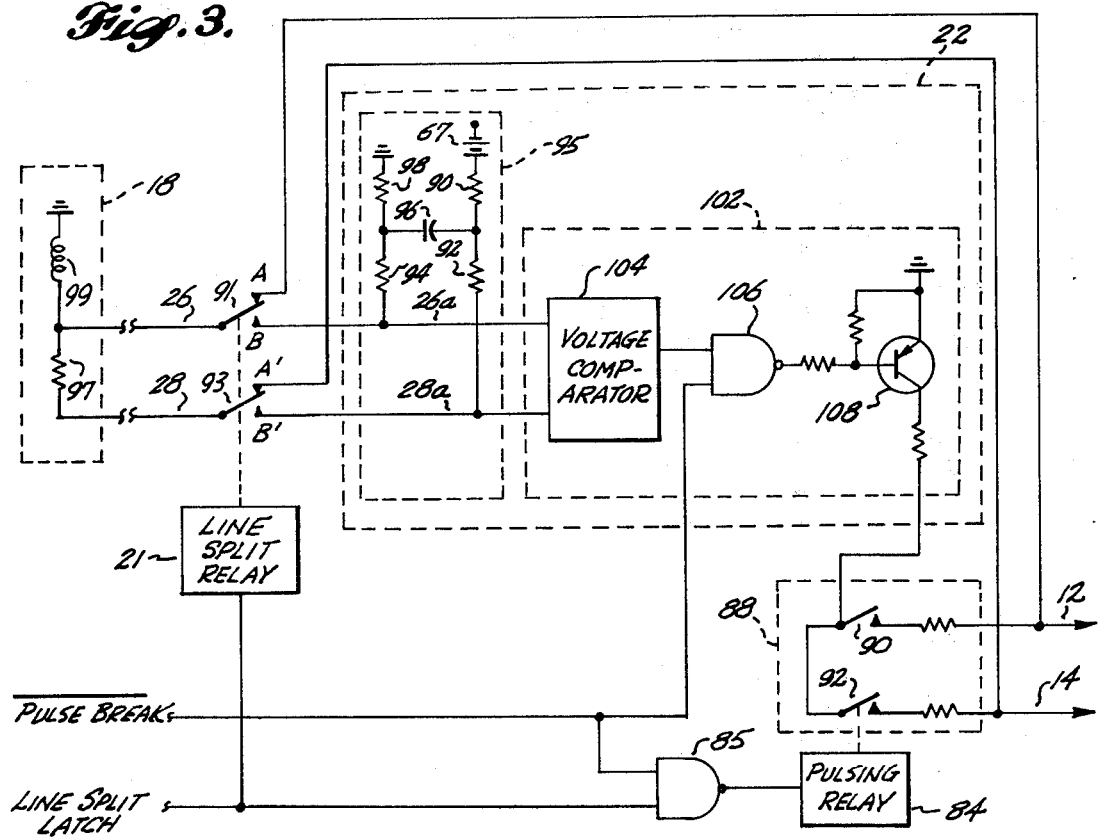
FIG. 3 is a schematic diagram of the signal reproduction portion of the block diagram of FIG. 2.

Referring to FIG. 1, telephone 18 is shown connected directly to a central office 16 through tip and ring lines 12 and 14, respectively, from the central office 16, and corresponding tip and ring lines 26 and 28, from the telephone 18. In a dial-type telephone, this direct connection between the telephone and the central office is permanent. In a telephone which generates multi-frequency tone signals instead of dial pulses, however, a tone-to-pulse converter 20 is required to make the multifrequency tones generated by the telephone 18 compatible with the pulse switching equipment in the central office. A line split relay 21 operates to break the direct connection between the central office 16 and telephone 18, and switches in the tone-to-pulse converter 20 during initiation of communication. As explained above, ANI equipment in central office 16 is used to automatically distinguish one party from another on a two-party line during initiation of communication by one party by sensing the presence (or absence) of a ground loop placed on the tip line of one party. The ground loop is typically formed by a portion of the bell in the telephone, however, and in the case of multifrequency tone telephones, where the connection to the central office is broken by converter 20, the ground loop cannot be recognized by the ANI central office equipment. The ANI equipment thus is unable to distinguish which party on a two-party line is initiating a communication, and an operator is thus forced to come on the line. The present invention is a circuit which permits the use of existing ANI central office equipment with multi-frequency tone generating telephones.

Referring again to FIG. 1, tip and ring lines 12 and 14, respectively, leading from a telephone central switching office 16 are shown connected to a multi-frequency tone telephone 18 using a tone-to-pulse converter 20. During the calling (initiation of communication with) another party, telephone 18 is connected to the central office through converter 20; after communication is established, the line pair 12,14, from the central office 16 is connected directly to the telephone 18.

The identification forwarding circuit 22 of the present invention operates in conjunction with the tone-to-pulse converter 20. Many tone-to-pulse converter systems are currently available and may be successfully used with the identification circuit 22 of the present invention. The operation of a typical tone-to-pulse converter, shown in block diagram form in FIG. 1, will now be briefly described so as to clarify the operation of the identification forwarding circuit 22 and its functional relationship to typical tone-to-pulse converter circuitry. When a telephone receiver is removed from its hook by a calling party, current sensor 24 detects an unbalanced voltage condition between telephone tip and ring lines 26 and 28, respectively, and in consequence, applies a control seize signal to power supply logic circuit 30. The logic circuit 30 is connected to and energizes circuit power supply 32, which in turn energizes the remainder of the tone-to-pulse converter 20.

Typically a dual tone multi-frequency signaling (dtmf) system in a telephone includes a plurality of discrete frequency oscillators, two of which are selected when a given push button on the telephone is operated. The frequency difference between the two frequencies is the tone for the particular push button operated. When the push button associated with the first position of the number to be called is operated, the two frequencies generated by the telephone dtmf system are applied to difference amplifier 34, the output of which is applied to filter 36. The signals from filter 36 are amplified by amplifier 38 and then are applied to a second filter 40. The two signals from filter 40 are applied to a discriminator 42 which is divided into high and low frequency sections 44 and 46. The lower frequency of the two signals is applied to section 46, and the higher frequency to section 44. One of the output lines 44a through 44d in the high frequency section 44 will pass the high frequency signal from filter 40, and one of the lines 46a through 46d will pass the low frequency signal from filter 40. The output lines 44a through 44d and 46a through 46d are connected to a discriminator latch circuit 48, comprised of high frequency and low frequency sections 49 and 51, respectively, which include high frequency output lines 49a through 49d and low frequency output lines 51a through 51d. High frequency latch output lines 49a through 49d are connected to OR gate 50 and low frequency latch output lines 51a through 51d are connected to OR gate 52. The outputs of OR gates 50 and 52 are applied to both latch circuit 54 and timer 56. Discriminator output lines 46a through 46d are also connected to latch circuit 54. The output of latch circuit 54 is applied to control logic circuit 58 and to line split latch circuit 60.

When the line split latch circuit 60 is energized by latch 54, it immediately energizes relays 62 and 21 which, in sequence, apply circuit power from power supply 67 to telephone tip and ring lines 26 and 28 for continued operation of the telephone 18, and then disconnect central office tip and ring lines 12 and 14 from direct connection to the telephone 18, and connecting in the identification forwarding circuit 22 of the present invention. Line split latch circuit 60 also applies a signal to timer 66, which disables the tone-to-pulse converter 20 in the event a preselected amount of time occurs between the initial operation of sensor 24 and the first tone generated by telephone 18, or between subsequent tones. As additional timing protection, the signals from OR gates 50 and 52 energize guard timer 56, which insures that the signals from discriminator latch circuit 48 exist for a predetermined amount of time, thus distinguishing actual telephone signals from transients or other circuit noise. If the signals last for the predetermined amount of time, guard timer 56 energizes latch circuit 68, which in turn controls latch gate complex 70 to gate the high and low frequency signals from the discriminator latch circuit 48 to a binary decoder 72, which decodes the high and low frequencies into corresponding digital signals.

Simultaneously with its control of latch gate complex 70, latch circuit 68 applies a signal to the control logic circuit 58, which is responsive to control logic clock 59, and to latch circuits 54 and 68. In response, control logic circuit 58 controls the shifting of the information from decoder 72 into memory 74. The individual memory output lines 74a through 74d are connected to OR gate 76 the output of which is applied to a control connection 77 of pulse counter 78. The signals from memory 74 on output lines 74a through 74d also set pulse counter 78 to a corresponding initial setting. Following this preset of counter 78 by the output signals from memory 74, counter 78 begins to generate output pulses on line 80 as it counts down toward zero. These counter output pulses, which correspond to the tone frequencies originally generated by the telephone 18 are then applied to a pulse control circuit 82, the output of which controls pulse relay 84.

Since the rate of signal generation by the operator of telephone 18 may be faster than the rate of pulse generation by pulse control circuit 82, a delay timer 81 is provided to control the output of memory 74, which is adapted to store more than one set of binary signals from binary decoder 72. In operation the delay timer inhibits the output of memory 74 as long as pulses continue to be received from the pulse control circuit 82.

Timer 86, responsive to an output from pulse relay 84 controls the pulsing of pulse relay 84 through the pulse control circuit 82. Pulse relay 84 in turn applies pulses to a pulsing loop circuit 88, which is connected across the tip and ring lines 12 and 14 from the central office 16, thereby completing the telephone circuit. The pulses applied to the tip and ring lines 12,14, under the control of pulsing relay 84 correspond to the frequencies generated by the telephone, but are now in a form which can be recognized by existing pulse switching equipment in the telephone central office.

Referring to FIG. 3, in the telephone 18 of one party (typically the tip party) on a two-party line, is connected a ground loop 99, such as an inductance to ground having a resistance in the range of 2700 ohms. This circuit is used for automatic number identification and typically forms a portion of the ringer or bell circuit in the telephone. The identification forwarding circuit 22 of the preferred embodiment of the present invention, which permits the use of existing ANI equipment with multifrequency tone telephones, is shown in more detail in FIG. 2. Line split relay 21, under the control of a signal from the line split latch circuit 60, operates to "split" the central office tip and ring lines 12 and 14 from the corresponding tip and ring connections 26 and 28 in the telephone 18, and to connect an identification forwarding circuit 22 (as well as the tone-to-pulse converter 20) therebetween. Pulsing relay 84 controls the position of the contacts 90 and 92, the contacts being normally closed (idle condition) and then opened by relay 84 to provide the pulses seen by the central office. Relay 84 is controlled by AND gate 85, the output of which is high (contacts 90, 92 are closed) when the line split latch signal and the logic signal $\overline{\text{PULSE BREAK}}$, which is the inverted signal from pulse control 82, are simultaneously high. When the logic signal $\overline{\text{PULSE BREAK}}$ goes low, indicating the presence of pulse information from the tone-to-pulse converter 20, AND gate 85 is low and contacts 90 and 92 open.

As explained above, the operation of splitting lines 26 and 28 (telephone pair) from lines 12 and 14 (central office) by relay 21 results in the ANI equipment in the central office being unable to sense the ground loop present on the line of one party of a two-party line, and thus makes automatic number identification impossible. Identification forwarding circuit 22, however, remedies this problem by detecting the ground loop (or lack thereof) present in the telephone 18 and then reproducing it on pulsing loop 88. When line split relay 21 operates, switches 91 and 93 will be moved into the B–B' position, thereby connecting the forwarding circuit 22 across tip and ring lines 26,28. Voltage sensing circuit 95 detects the presence (or absence) of a ground loop on tip and ring lines 26,28. It operates as follows. If telephone 18 connected to lines 26,28 does not have a ground loop, a current path will be established from battery 67 through resistance 90, resistance 92 to line 28a, across switch 93 to line 28, through the telephone connection 97 across the lines, back through line 26, switch 91, line 26a, through resistances 94, and 98, to ground. Since resistances 92 and 94 are a matched pair, and resistances 90 and 98 are also equal, although lower in value than resistances 92 and 94, the current flowing in resistance 92 is equal to the current in resistance 94, and there is a voltage balance across the lines 26,28. Capacitor 96 acts to stabilize the voltage balance. The voltage balance across the lines is detected by comparator 104, which in turn controls NAND gate 106 and transistor 108 such that pulse loop 88 is isolated from ground by transistor 108.

If, however, the telephone 18 has an identification ground loop 99 in its telephone circuit (one party on a two-party line will have the ground loop), voltage sensing circuit 95 will sense the voltage imbalance caused thereby. When line split relay 21 operates, current will proceed from battery 67 through resistances 90 and 92, line 28a, switch 93, line 28 and through the telephone line connection to line 26. At line 26, the current will split, some of it going to ground through the ground loop 99, and the remainder back through line 26, switch 91, resistances 94 and 98 to ground. A current imbalance through resistors 92 and 94 results, and thus a resulting voltage imbalance between lines 26a and 28a. This voltage imbalance is detected by comparator 104, forcing its output to go negative. The negative output of comparator 104 results in the transistor 108 turning on whenever the signal $\overline{\text{PULSE BREAK}}$ is high. When transistor 108 turns on, a ground loop is provided on pulse loop 88, which ground loop is identifiable by and compatible with the ANI equipment in the central office.

Figure 2:
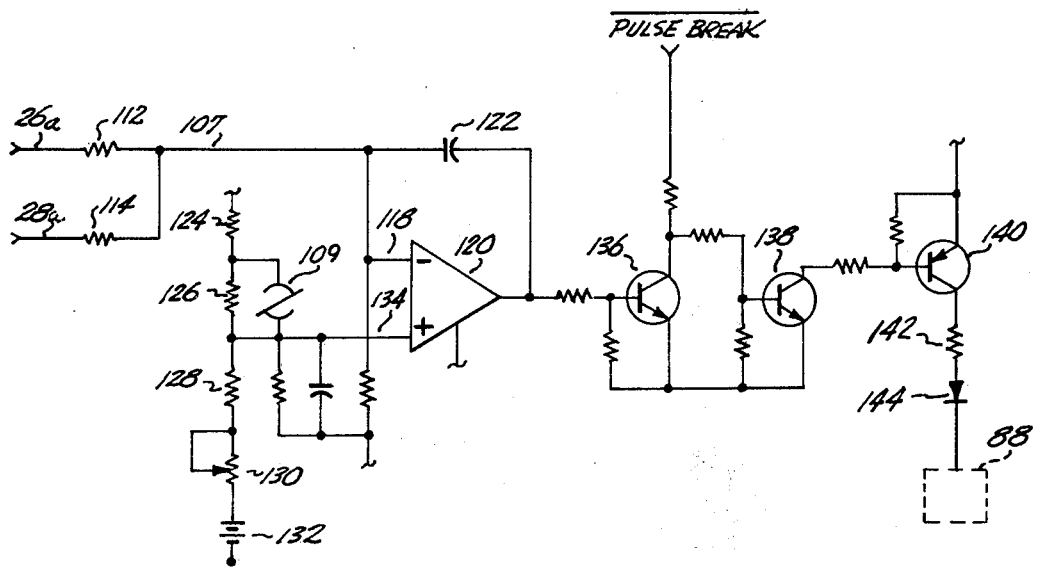
FIG. 2 is a block diagram of the identification forwarding circuit of the present invention, showing its electrical connection with a tone-to-pulse converter in a telephone.

Referring to FIG. 2, showing the circuit details of monitoring and reproduction circuit 102, lines 26a and 28a (FIG. 2) are shown as input lines through resistances 112 and 114, respectively. If a voltage balance exists between lines 26a and 28a, the voltage at the common point 107 will be substantially midway between the magnitude of battery voltage 67, which is typically 48 volts, and ground. The signal at line point 107 is connected to the inverting input 118 of operational amplifier 120, which is connected with a capacitor 122 feedback loop so as to function as a comparator. Resistances 124, 126, 128 and potentiometer 130 in combination with battery 132 form a variable voltage divider network for establishing a predetermined value of voltage bias at the non-inverting input 134 of operational amplifier 120. The voltage bias established is typically equal to the magnitude of the voltage at point 107 when a voltage balance exists between lines 26a and 28a. Calibration element 109 is provided to short out resistance 126. Potentiometer 130 may be used to adjust the value of bias applied. When the magnitude of the signals at inputs 118 and 134 are substantially equal, the output of op-amp 120 is positive, and transistor 136 turns on. When transistor 136 is on, a current path is established for the logic signal $\overline{\text{PULSE BREAK}}$, and transistor 138 turns off, as does transistor 140. Since transistor 140 is off, no ground connection is applied to the pulsing loop 88 (FIG. 2), through 2700 ohm resistance 142 and diode 144.

When a voltage imbalance between lines 26a and 28a created by the presence of a ground connection 99 to line 26a is sufficient to make the magnitude of the input at 118 greater than that at input 134, the output of operational amplifier 120 goes negative, which turns transistor 136 off, and blocks the current path of PULSE BREAK through transistor 136. When the signal PULSE BREAK is high, transistor 138 will turn on, which in turn causes transistor 140 to turn on. When transistor 140 turns on, ground is connected to the pulsing loop 86 through the 2700 ohm resistor 142 and diode 144. As long as PULSE BREAK remains positive, a 2700 ohm loop to ground will be present on the pulsing loop, recognizable by the ANI equipment in the central office.

Thus, existing ANI equipment, for automatic identification of the calling party on a two-party line, is made completely compatible with multi-frequency telephone equipment by the circuit of the present invention, which forwards a ground loop in the telephone to the lines from the central office during specified times.

Although an exemplary embodiment of the invention has been disclosed herein for purposes of illustration, it will be understood that various changes, modifications and substitutions may be incorporated in such embodiment without departing from the spirit of the invention as defined by the claims which follow:

We claim:

1. In a tone-to-pulse converter adapted to detect DTMF signals generated by a DTMF telephone having the ability to condition a telephone line in a manner that identifies the telephone, split the telephone line carrying the DTMF signals into a section remaining connected to the DTMF telephone and a section disconnected from the DTMF telephone, and outpulse a series of pulses similar to those generated by a rotary dial telephone to the section of the split line disconnected from the DTMF telephone, the improvement comprising an identification condition forwarding circuit means for sensing condition information created on the split line by the DTMF telephone on the section remaining connected to the DTMF telephone and conditioning the section of the split line disconnected from said DTMF telephone so that said disconnected section carries the same condition information as the section remaining connected to the DTMF telephone.

2. The improvement claimed in claim 1 wherein said identification condition forwarding circuit means comprises:
   a detector for detecting the balance/unbalance condition of the section of the telephone line remaining connected to the DTMF telephone; and,
   monitoring and conditioning means connected to said detector for monitoring the status of said detector and, in accordance therewith, creating the same balance/unbalance condition on the section of said telephone line disconnected from the DTMF telephone.

3. The improvement claimed in claim 2 wherein:
   said telephone line includes a tip and ring pair;
   the ground/unground status of one of said tip and ring pair is the condition information detected by said detector;
   said detector creates a voltage on each of said tip and ring pair on the section thereof remaining connected to the DTMF telephone, said created voltages being related to the ground/unground condition of said tip and ring pair; and,
   said monitoring and conditioning means creates the same ground/unground condition on the section of said tip and ring pair disconnected from said DTMF telephone.

4. The improvement claimed in claim 3 wherein said detector comprises:
   a voltage source;
   a first connecting circuit connecting said voltage source to one of said tip and ring pair; and,
   a second connecting circuit connecting the other of said tip and ring pair to ground.

5. The improvement claimed in claim 4 wherein said first connecting means comprises first and second resistances series connected, in that order, between said voltage source and said one of said tip and ring pair and said second connecting means comprises third and fourth resistors series connected, in that order, between said other of said tip and ring pair and ground, said first resistor being equal in resistive value to said fourth resistor and said second resistor being equal in resistive value to said third resistor; and, including a capacitor connected between the junction between said first and second resistors and the junction between said third and fourth resistors.

6. The improvement claimed in claim 5 wherein said monitoring and conditioning means comprises:
   a voltage comparator connected to said tip and ring pair so as to sense the voltages applied thereto by said detector; and,
   a grounding circuit connected to the output of said voltage comparator and to a selected one of said tip and ring pair in the section thereof disconnected from the DTMF telephone in a manner such that said voltage comparator connects said grounding circuit to said selected one of said tip and ring pair on the side disconnected from said DTMF telephone when said voltage comparator senses that one of said tip and ring pair of the section thereof remaining connected to said DTMF telephone is grounded.

7. The improvement claimed in claim 6 wherein said monitoring and conditioning means also includes a gate having one input connected to the output of said voltage comparator and an output connected to said grounding circuit, said gate having a second input connected to receive the series of pulses outpulsed by said tone-to-pulse converter in a manner such that said series of pulses controls the grounding of said selected one of said tip and ring pair on the side thereof disconnected from the DTMF telephone.

8. The improvement claimed in claim 1 wherein:
   1. said telephone line includes a tip and ring pair;
   2. the ground/unground status of one of said tip and ring pair is the condition information detected by said detector; and,
   3. said identification condition forwarding means comprises:
       a. detector means connected to said tip and ring pair for creating a voltage on each of said tip and ring pair on the section thereof remaining connected to the DTMF telephone, said created voltages being related to the ground/unground condition of said tip and ring pair; and,
       b. monitoring and conditioning means connected to said detector means for monitoring the condition of said detector means and creating the same ground/unground condition on the section of said tip and ring pair disconnected from said DTMF telephone.

9. The improvement claimed in claim 8 wherein said monitoring and conditioning means comprises:
a voltage comparator connected to said tip and ring pair so as to sense the voltages applied thereto by said detector; and,
a grounding circuit connected to the output of said voltage comparator and to a selected one of said tip and ring pair in the section thereof disconnected from the DTMF telephone in a manner such that said voltage comparator connects said grounding circuit to said selected one of said tip and ring pair on the side disconnected from said DTMF telephone when said voltage comparator senses that one of said tip and ring pair of the section thereof remaining connected to said DTMF telephone is grounded.

10. The improvement claimed in claim 9 wherein said monitoring and conditioning means also includes a gate having one input connected to the output of said voltage comparator and an output connected to said grounding circuit, said gate having a second input connected to receive the series of pulses outpulsed by said tone-to-pulse converter in a manner such that said series of pulses controls the grounding of said selected one of said tip and ring pair on the side thereof disconnected from the DTMF telephone.

11. An identification condition forwarding circuit for use in a communication system wherein related line pairs, connecting remote stations to a central station, are split during a portion of a total, variable length, communication sequence and wherein selected ones of said remote stations are adapted to place a predetermined ground/unground identification condition on at least one of their related line pair, said identification condition forwarding circuit comprising:
detection means, connected to the section of a split line pair remaining connected to a remote station, for detecting the presence of a predetermined ground/unground identification condition placed on said line pair by the remote station related to said line pair by creating a voltage on each line of said line pair on the section thereof remaining connected to the remote station, said created voltages being related to the ground/unground condition of said line pair; and,
monitoring and conditioning means connected to said detection means for monitoring the status of said detection means and, in accordance therewith, conditioning the section of the line pair disconnected from a remote station such that said monitoring and conditioning means creates a ground/unground identification condition, on the section of said line pair disconnected from said remote station, the same as the predetermined ground/unground identification condition placed on said section of said line pair remaining connected to said remote station.

12. An identification condition forwarding circuit as claimed in claim 11 wherein said detection means comprises:
a voltage source;
a first connecting circuit connecting said voltage source to one of said line pair; and,
a second connecting circuit connecting the other of said line pair to ground.

13. An identification condition forwarding circuit as claimed in claim 12 wherein said first connecting means comprises first and second resistances series connected, in that order, between said voltage source and said one of said line pair and said second connecting means comprises third and fourth resistors series connected, in that order, between said other of said line pair and ground, said first resistor being equal in resistive value to said fourth resistor and said second resistor being equal in resistive value to said third resistor; and, including a capacitor connected between the junction between said first and second resistors and the junction between said third and fourth resistors.

14. An identification condition forwarding circuit as claimed in claim 13 wherein said monitoring and conditioning means comprises:
a voltage comparator connected to said line pair so as to sense the voltages applied thereto by said detector; and,
a grounding circuit connected to the output of said voltage comparator and to a selected one of said line pair in the section thereof disconnected from said remote station in a manner such that said voltage comparator connects said grounding circuit to said selected one of said line pair on the side disconnected from said remote station when said voltage comparator senses that one of said line pair of the section thereof remaining connected to said remote station is grounded.

15. An identification condition forwarding circuit as claimed in claim 11 wherein said monitoring and conditioning means comprises:
a voltage comparator connected to said line pair so as to sense the voltages applied thereto by said detector; and,
a grounding circuit connected to the output of said voltage comparator and to a selected one of said line pair in the section thereof disconnected from said remote station in a manner such that said voltage comparator connects said grounding circuit to said selected one of said line pair on the side disconnected from said remote station when said voltage comparator senses that one of said line pair of the section thereof remaining connected to said remote station is grounded.

16. An identification condition forwarding circuit for use in a communication system wherein loop forming line pairs, connecting remote stations to a central station, are split during a portion of a total, variable length, communication sequence and wherein at least some of said remote stations are adapted to place a loop imbalance identification condition on their respective line pair, said loop imbalance identification condition being created by resistively grounding the loop formed by said respective line pair, said identification condition forwarding circuit comprising:
detection means, connected to the section of a split line pair remaining connected to a remote station, for detecting the existence of a loop imbalance identification condition placed on said line pair by the remote station related to said line pair; and,
monitoring and conditioning means connected to said detection means for monitoring the status of said detection means and, in accordance therewith, conditioning the section of the line pair disconnected from a remote station such that said disconnected line pair is loop imbalance identification conditioned the same as the section of the line pair remaining connected to said remote station.

* * * * *